United States Patent [19]

Pan

[11] 4,295,225
[45] Oct. 13, 1981

[54] FIBER OPTIC REPEATER

[75] Inventor: Jing-Jong Pan, Melbourne, Fla.

[73] Assignee: Harris Corporation, Cleveland, Ohio

[21] Appl. No.: 934,885

[22] Filed: Aug. 18, 1978

[51] Int. Cl.³ .............................................. H04B 9/00
[52] U.S. Cl. ................................... 455/601; 330/277
[58] Field of Search ............... 307/311; 250/211 J, 250/199; 331/94.5 M; 357/30; 330/277; 455/601, 617-619

[56] References Cited

U.S. PATENT DOCUMENTS

| | | | |
|---|---|---|---|
| 3,319,080 | 5/1967 | Cornely et al. | 250/199 |
| 3,405,330 | 10/1968 | Hilbiber | 330/277 |
| 3,465,260 | 9/1969 | Sullivan | 330/277 |
| 3,716,730 | 2/1973 | Cerny, Jr. | 330/277 |
| 3,770,968 | 11/1973 | Hession et al. | 250/211 J |
| 4,075,576 | 2/1978 | Eden | 330/277 |
| 4,179,668 | 12/1979 | Scheuermann | 330/277 |

OTHER PUBLICATIONS

Runge-An Experimental 50 mb/s Fiber Optic PCM Repeater IEEE Transactions on Comm., vol. Com-24, #4, pp. 413-414.
Direct Modulation of D.H.-GaAlAs Lasers with GaAs MESFETS-Electronics Letters-Oct. 16, 1979, vol. 11, #21, pp. 515, 516.
Using FETs for Precision Millivolt Sources-Electronic Design-vol. 12, #3, Feb. 3, 1964-p. 42.
Suzuki et al., - GaAs Power FET-Fujitsu Sci. & Tech. Jour. (Japan) vol. 12, #2, Jun. 1976, pp. 163-177.
Broadband Lumped-Element X-Band GaAs FET Amplifier Electronics Letter-6th Feb. 1975, vol. 11, #3, pp. 58, 59.
Swartz-A New Type of Gallium Arsenide Field-Effect Phototransistor RCA Review, vol. 32, Mar. 1971, No. 1, pp. 24-41.
Liechti-Microwave Field Effect Transistors-19-76-IEEE Trans. on Microwave Theory & Techniques, vol. MTT 24, #6, pp. 279-330, Jun. 1976.

*Primary Examiner*—Joseph A. Orsino, Jr.
*Attorney, Agent, or Firm*—Craig and Antonelli

[57] ABSTRACT

A fiber optic repeater includes a photodetector stage, an amplification and pulse sharpening stage and a driven stage for an injection laser diode, the three stages being made up of only three MESFETs, preferably of the GaAs type and each stage being similar to the other stages in configuration so as to lend itself to MSI or LSI fabrication of a very simplified and reliable microwave frequency optical repeater.

10 Claims, 3 Drawing Figures

FIBER OPTIC REPEATER

The present invention relates in general to optical communication systems, and more particularly, to an improved photodetector which may form part of a simplified optical repeater.

Fiber-optic communications, optical communications through air or vacuum, optical signal processing systems and optical information processings require a high performance, miniature, solid state photodetector. Often, the PIN photodiode and the avalanche photodiode (APD) are selected for detection purposes; however, these two photodetectors have inherent problems which limit their use in practice.

First of all, the PIN photodiode does not have internal gain and a wideband operation capability; hence, it has been less popular then the avalanche photodiode, which does have internal gain. However, the APD needs a high bias voltage in the range of 160–400 V and can not respond to very high frequencies, for example, above 1 GHz. In addition, the APD is operated at avalanche condition; therefore, it has a relatively high noise equivalent power (NEP), which is a critical factor for long distance communications. Finally, the APD's quantum efficiency and avalanche gain varies with temperature, so that it often requires quite complicated compensation circuits.

In the past, the conventional phototransistor has been fabricated in bipolar transistor configuration and has a very low frequency response. A MOS transistor doped with gold also has been fabricated however, this device similarly has a very low frequency response less then 50 MHz. Thus, there has been a need for a semiconductor device for use as a photodetector which has internal gain and a wideband operation capability. The recently advanced low noise GaAs MESFET (Metal Semiconductor Field Effect Transistor) appears to answer this need in that it has a high frequency response up to 26 GHz and can respond in a wide spectral range, visible or infrared wavelengths, having a particularly high responsivity between 780 nm to 950 nm. In addition, this device has an excellent switching behavior with rise time in the pico second range and low driving power.

Long distance fiber-optic communications, digital and analog, require repeaters to regenerate the signals because the inherent fiber attenuation and dispersions limit the link distance. The conventional fiber optic digital repeater has very complicated circuitry including amplification, timing, equalization, decision and regeneration circuits. Thus, these circuits have many disadvantages, the principle one being high cost due to the numerous parts, semiconductor devices and components involved, and design and fabrication complications, particularly for high data rate repeaters. Other disadvantages of these conventional circuits include relatively poor reliability, poor efficiency, high power consumption and large physical size. In addition, in these conventional circuits, more noises are introduced into the repeater because extra active devices and resistive elements are in the circuits. The complexity of the required timing circuit creates fabrication difficulties for data rates above 500 Mb/s and nonlinear compression of the bipolar transistors introduces waveform distortions as well as harmonics distortion.

These problems are solved by the present invention through the use of a low noise GaAs MESFET as a solid state photodetector which may form part of a very simplified fiber optic repeater.

It is therefore a principle object of the present invention to provide an extremely simple, low cost, high data rate fiber optic repeater.

It is another object of the present invention to provide a fiber optic repeater having high reliability, low power consumption and low voltage operation.

It is still another object of the present invention to provide a repeater circuit of the type described using semiconductor devices which can sharpen and amplify signals simultaneously.

The present invention provides a fiber optic repeater system utilizing three field effect transistors (FET) interconnected such that a first FET operates as an optic detector a second FET operates as a signal amplifier, and a third FET is utilized as an injection laser diode (ILD) driver. In a preferred embodiment, these FETs may be implemented as microwave GaAs MESFETs, which combine the pulse sharpening effect and amplification effect, thereby eliminating the need for timing, equalization and decision circuits.

These and other objects, features and advantages of the present invention will become more apparent from the following detailed description of the present invention, when taken in conjunction with the accompanying drawings, in which.

Figure 1:
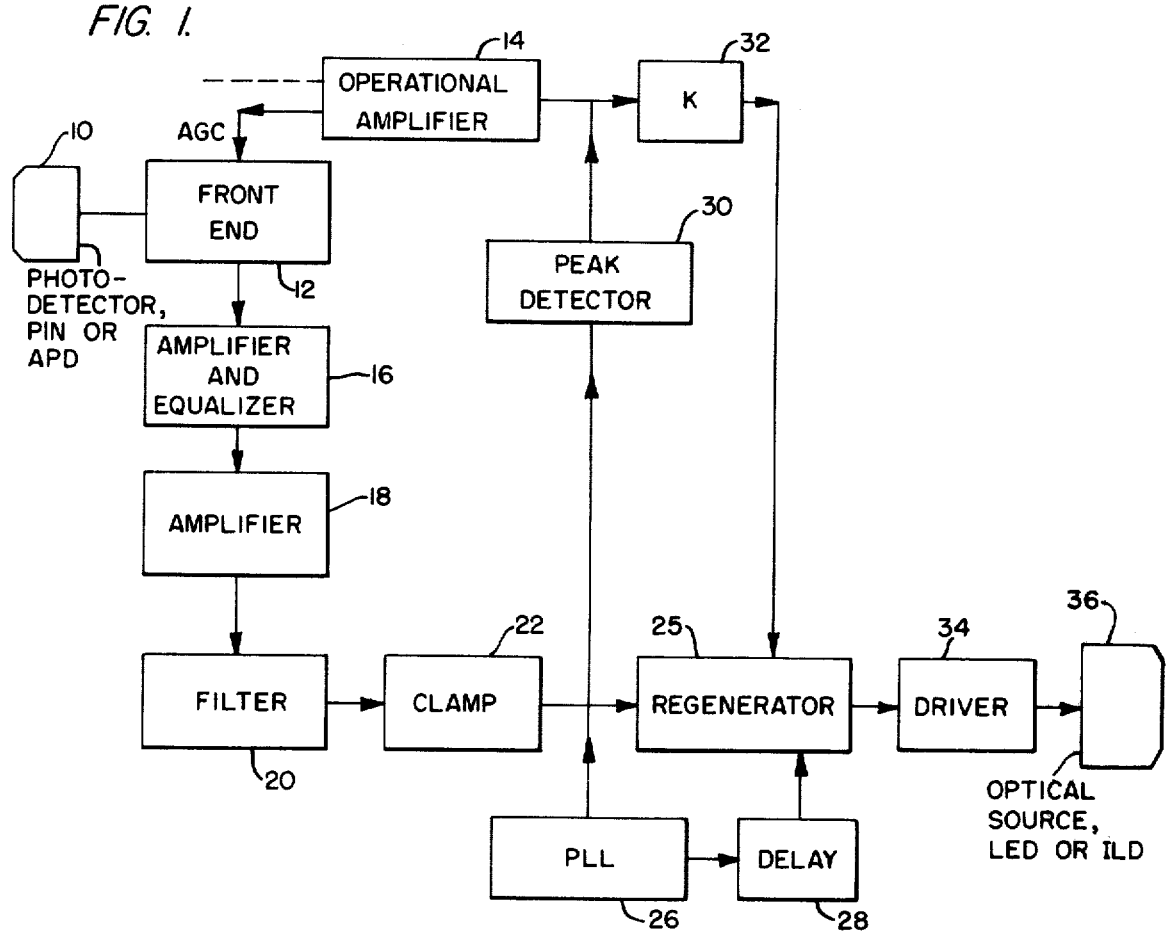
FIG. 1 is a schematic block diagram of a conventional fiber optic digital repeater.

A conventional fiber optic digital repeater, as illustrated in FIG. 1, includes a photodetector 10 in the form of a PIN diode or avalanche photodiode optically coupled to one end of an optical fiber from which optical data in digital form is received. The output of the photodetector 10 is applied to an impedance matching and hybrid control circuit 12 to which is also applied an automatic gain control (AGC) signal from operational amplifier 14. The output of circuit 12 is applied through amplifier and equalizer circuit 16, amplifier 18 and filter 20 to clamp circuit 22, which clamps the signal to a reference voltage. The filter 20 serves to remove any harmonic distortion which may have been introduced by the amplifier 18.

The output of clamp circuit 22 is applied to one input of a signal regenerator circuit 25 which operates as a square wave generator. In order to control the timing, a timing circuit is provided including a phase locked loop 26 providing a train of pulses through delay circuit 28 to a second input of the signal regenerator circuit 25 as a clock signal. An output of the phase locked loop 26 is also applied to a peak detector 30, the output of which is applied, on the one hand, to the operational amplifier 14 which generates the AGC signal, and on the other hand, through an equalizer circuit 32 to a third input of the signal regenerator circuit 25.

When all three inputs of the signal regenerator circuit 25 are positive, a square wave output signal is applied therefrom to a driver circuit 34, which drives the optical source 36 in the form of a light emitting diode or injection laser diode. However, the complexity of the conventional fiber optic digital repeater is apparent from FIG. 1. The need for amplification, timing, equalization, decision and regeneration circuits involving numerous parts, devices and components greatly adds to the cost of the system and creates serious design and fabrication complications, as well as susceptibility to noise and high power consumption, which leads to poor efficiency and reliability.

Figure 2:
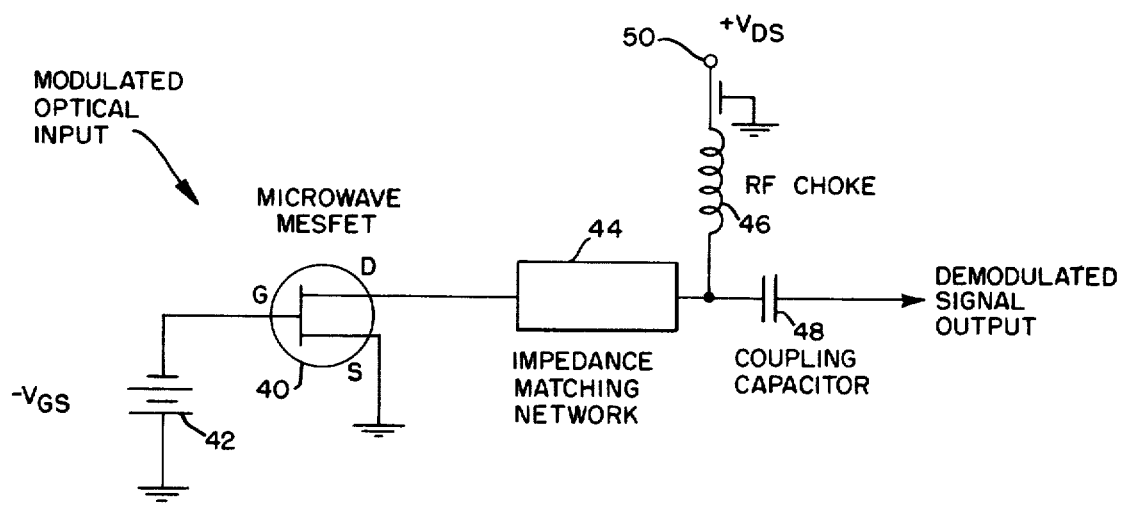
FIG. 2 is a schematic circuit diagram of a photodetector circuit in accordance with the present invention.

On the other hand, in accordance with the present invention, an extremely simple and reliable photodetector circuit, capable of operating at microwave frequencies and applicable to a simplified optical repeater circuit, may be provided as seen in FIG. 2. A field effect transistor 40, preferably a GaAs MESFET, has its gate electrode connected to negative d.c. bias voltage source 42, its source electrode connected to ground and its drain electrode connected through impedance matching network 44 to output coupling capacitor 48. Positive d.c. bias voltage at terminal 50 is applied through RF choke 46 to a point between impedance matching network 44 and coupling capacitor 48.

The modulated optical input, such as provided by an optical fiber, is applied to the gate of the field effect transistor 40, which operates as a microwave frequency photodetector, or a demodulator. In this regard, the GaAs MESFET has a high frequency response up to 26 GHz and can respond to a wide spectral range, making it particularly suitable for use as a photodetector. However, other MESFET devices such as InP, InGaAs, and InP/InGaAs devices may be utilized where optimization at other wavelengths is desired.

Figure 3:
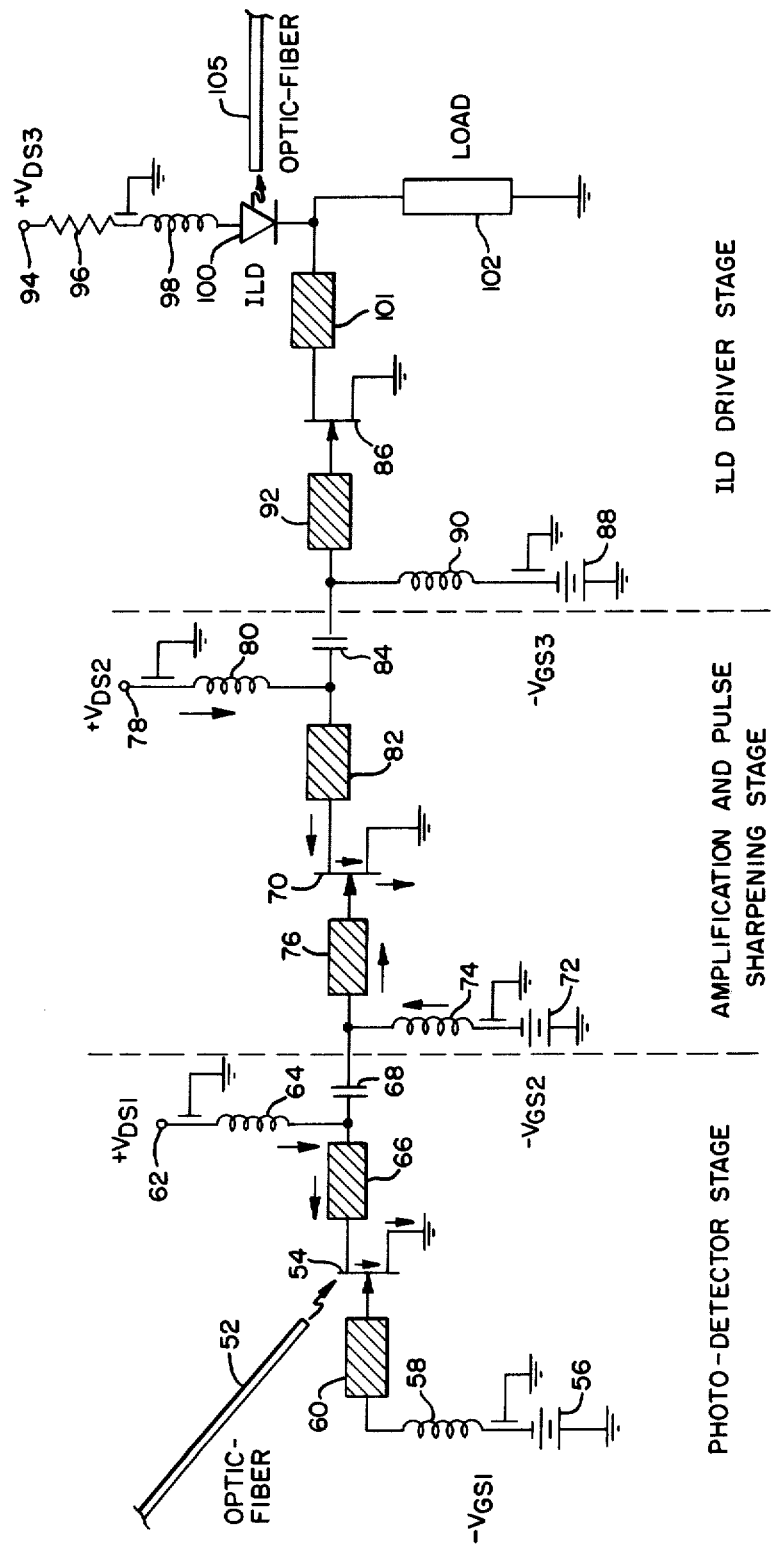
FIG. 3 is a schematic circuit diagram of a fiber optic repeater embodying the features of the present invention.

FIG. 3 illustrates an example of the fiber optic repeater utilizing the features of the present invention. This circuit comprises three stages—the first stage is the photodetector stage, which is followed by the amplification and pulse sharpening stage and a driver stage for the optical source. The simplicity of this circuit will be noted initially from the fact that the entire circuit embodies only three field effect transistors.

The photodetector stage is similar to that illustrated in FIG. 2. An optical fiber 52 applies a modulated optical input to the gate electrode of a field effect transistor 54. The gate-source bias for the transistor 54 is provided from d.c. bias source 56 through RF choke 58 and impedance matching network 60 to the gate electrode thereof. The drain-source bias for transistor 54 is provided from bias terminal 62 through RF choke 64 and impedance matching network 66 to the drain electrode thereof. The output from the photodetector stage is taken through coupling capacitor 68.

The amplification and pulse sharpening stage is formed in a manner similar to the photodetector stage and comprises a field effect transistor 70, the gate electrode of which is connected to bias voltage source 72 via RF choke 74 and impedance matching network 76. Similarly, the drain electrode of transistor 70 is connected to bias voltage terminal 78 via RF choke 80 and impedance matching network 82. The output of the stage is taken through coupling capacitor 84. When the transistor 70 is provided as a GaAs MESFET, the single transistor can function as an amplifier and a pulse regenerator simultaneously. Consequently, no timing, equalization and decision circuits are required for the digital signal regeneration. In addition, a high amplification gain up to 26 GHz is available with approximately 6 dB/octave gainfrequency slope. Thus, a single MESFET provides approximately 16 dB gain at 2 GHz.

The driver stage once again is of similar configuration to the other two stages of the circuit, so that the circuit clearly lends itself to MSI or LSI configurations. The field effect transistor 86, which again is preferably a GaAs MESFET, has its gate electrode connected to bias voltage source 88 via RF choke 98, injection laser diode 100 and impedance matching network 101. A load 102 is connected between the diode 100 and ground, the light output of the diode 100 being coupled to optical fiber 105.

The impedance matching networks in the circuit of FIG. 3 may advantageously be by a microstrip fabricated on the substrate of the integrated circuit in accordance with known techniques.

The fiber optic repeater of the present invention clearly overcomes not only all the disadvantages of conventional repeaters, but also can operate in a very wide temperature range without readjusting timing and decision circuits, which also are unnecessary with the use of the microwave GaAs MESFET or similar MESFET devices. In addition, when a dual gate FET is utilized, the device can perform AGC as well as amplification and pulse sharpening simultaneously.

While it is advantageous to use a GaAs MESFET in the photodetector stage of the fiber optic repeater, as seen in FIG. 3, it is also possible to use a PIN diode or an avalanche photodiode for this stage instead of a MESFET, although some loss in the advantages provided by the present invention would result.

While the invention has been particularly shown and described with reference to a preferred embodiment thereof, it will be understood by those skilled in the art that the invention is subject to various changes in form and details without departing from the spirit and scope of the invention as defined by the appended claims.

What is claimed is:

1. A fiber optic repeater comprising a photodetector circuit including an optic detecting MESFET coupled in said photodetector circuit to sense an optic input applied to the gate of said MESFET, an amplification and pulse sharpening circuit and a driver circuit connected in cascade with said photodetector circuit, said amplification and pulse sharpening circuit and said driver circuit each including a single MESFET.

2. A fiber optic repeater as defined in claim 1, wherein each of said MESFETs are GaAs MESFETs.

3. A fiber optic repeater as defined in claim 2 wherein said driver circuit includes an injection laser diode connected to the MESFET therein.

4. A fiber optic repeater comprising a photodetector circuit including an optic detecting MESFET coupled in said photodetector circuit to sense an optic input applied to the gate of said MESFET, an amplification and pulse sharpening circuit and a driver circuit connected in cascade, said amplification and pulse sharpening circuit and said driver circuit each including a MESFET, first bias voltage means connected to said MESFET for providing the gate-source bias thereof, and second bias voltage means connected to said MESFET for providing the drain-source bias thereof.

5. A fiber optic repeater as defined in claim 4, wherein an injection laser diode is connected to the drain of said MESFET in said driver circuit.

6. A fiber optic repeater as defined in claim 4, wherein said first bias voltage means includes a negative voltage source, an RF choke coil and an impedance matching network connected in series.

7. A fiber optic repeater as defined in claim 4, wherein said second bias voltage means includes a positive voltage source, an RF choke coil and an impedance matching network connected in series.

8. A fiber optic repeater as defined in claim 4, wherein said photodetector circuit has the same configuration as said amplification and pulse sharpening circuit.

9. A fiber optic repeater as defined in claims 4, 5, 6, 7 or 8, wherein each of said MESFETs are GaAs MESFETs.

10. A photodetector circuit as defined in claim 1 or 4, wherein said MESFET is a dual gate MESFET.

* * * * *